US008719249B2

(12) United States Patent
Bennett et al.

(10) Patent No.: US 8,719,249 B2
(45) Date of Patent: May 6, 2014

(54) QUERY CLASSIFICATION

(75) Inventors: Paul N. Bennett, Kirkland, WA (US);
David Maxwell Chickering, Bellevue, WA (US); Kevyn B. Collins-Thompson, Seattle, WA (US); Susan Dumais, Kirkland, WA (US); Daniel J. Liebling, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 540 days.

(21) Appl. No.: 12/464,496

(22) Filed: May 12, 2009

(65) Prior Publication Data

US 2010/0293174 A1 Nov. 18, 2010

(51) Int. Cl.
*G06F 17/30* (2006.01)

(52) U.S. Cl.
USPC .............................................. 707/708

(58) Field of Classification Search
CPC .............................................. G06F 17/30707
USPC ......... 707/705, 706, 708, 723, 726, 730, 735, 707/738, 739, 740, 741, 748, 749, 750, 912, 707/913, 914, 916, 943, 710, 711, 728, 731, 707/759, 769, 805
See application file for complete search history.

(56) References Cited

U.S. PATENT DOCUMENTS

| | | | |
|---|---|---|---|
| 5,926,808 A * | 7/1999 | Evans et al. ............................ 1/1 |
| 6,321,224 B1 * | 11/2001 | Beall et al. ............................ 1/1 |
| 6,631,496 B1 * | 10/2003 | Li et al. ............................ 715/200 |
| 7,496,567 B1 * | 2/2009 | Steichen ............................ 1/1 |
| 7,574,433 B2 * | 8/2009 | Engel ............................ 1/1 |
| 7,620,628 B2 * | 11/2009 | Kapur et al. ............................ 1/1 |
| 7,769,760 B2 * | 8/2010 | Watanabe et al. ............. 707/737 |
| 7,774,341 B2 * | 8/2010 | Aravamudan et al. ........ 707/731 |
| 7,779,009 B2 * | 8/2010 | Chowdhury et al. ......... 707/737 |
| 7,801,896 B2 * | 9/2010 | Szabo ............................ 707/739 |
| 8,010,545 B2 * | 8/2011 | Stefik et al. .................... 707/758 |
| 8,041,733 B2 * | 10/2011 | Rouhani-Kalleh ........... 707/771 |
| 2003/0061243 A1 * | 3/2003 | Kim et al. ...................... 707/200 |
| 2003/0172357 A1 * | 9/2003 | Kao et al. ...................... 715/529 |
| 2005/0055341 A1 * | 3/2005 | Haahr et al. ...................... 707/3 |
| 2005/0138079 A1 | 6/2005 | Liu et al. |

(Continued)

OTHER PUBLICATIONS

Beitzel, et al., "Improving Automatic Query Classification via Semi-supervised Learning", http://www.ir.iit.edu/~abdur/publications/beitzels-Classification.pdf.

(Continued)

*Primary Examiner* — Pierre Vital
*Assistant Examiner* — Evan Aspinwall
(74) *Attorney, Agent, or Firm* — Dan Choi; Carole Boelitz; Micky Minhas

(57) ABSTRACT

One or more systems and/or techniques are provided for constructing a query classification index that can be used to classify a query into relevant categories. Where documents in an index are classified into one or more category predictions for a category hierarchy, classification metadata is generated for categories to which a document in the index has been classified. Further, the classification metadata is associated to the corresponding documents in the index. Additionally, a query of the index can be classified using the metadata associated to the documents in the index, and query results can be provided that are classified by the one or more categories identified by the classification of the query.

20 Claims, 7 Drawing Sheets

(56) References Cited

U.S. PATENT DOCUMENTS

| | | | |
|---|---|---|---|
| 2006/0190439 | A1 | 8/2006 | Chowdhury et al. |
| 2007/0038601 | A1* | 2/2007 | Guha .............................. 707/3 |
| 2007/0156677 | A1* | 7/2007 | Szabo ............................. 707/5 |
| 2008/0065624 | A1 | 3/2008 | Sun et al. |
| 2008/0065631 | A1 | 3/2008 | Baeza-Yates et al. |
| 2008/0065659 | A1* | 3/2008 | Watanabe et al. ........... 707/100 |
| 2008/0201219 | A1* | 8/2008 | Broder et al. ................. 705/14 |
| 2008/0215557 | A1* | 9/2008 | Ramer et al. ..................... 707/4 |
| 2008/0270462 | A1* | 10/2008 | Thomsen .................. 707/103 R |
| 2009/0094223 | A1* | 4/2009 | Berk et al. ....................... 707/5 |

OTHER PUBLICATIONS

Beitzel, et al., "Analysis of Varying Approaches to Topical Web Query Classification", INFOSCALE'08, Jun. 4-6, 2008, Vico Equense, Napoli, Italy, http://delivery.acm.org/10.1145/1460000/1459713/a15-beitzel.pdf?key1=1459713&key2=5253998321&coll=GUIDE&dl=GUIDE&CFID=29066477&CFTOKEN=96993605.

Menasalvas et al., "An Integrated Web-Query Classification Approach Based on Rough Sets", http://www.ecmlpkdd2007.org/CD/workshops/RSKD/RSKD_3/RSKD_3.pdf.

Broder, et al., "Robust Classification of Rare Queries Using Web Knowledge", SIGIR'07, Jul. 23-27, 2007, Amsterdam, The Netherlands, http://www-cs-students.stanford.edu/~amrutaj/work/papers/qclass.pdf.

Taksa, et al., "Using Web Search Logs to Identify Query Classification Terms", International Conference on Information Technology (ITNG'07) 0-7695-2776-0/07, http://ieeexplore.ieee.org/stamp/stamp.jsp?tp=&arnumber=4151728&isnumber=4151645.

Billerbeck, Bodo, "Efficient Query Expansion", School of Computer Science and Information Technology RMIT University Sep. 2005, http://goanna.cs.rmit.edu.au/~bodob/pubs/Bil05.pdf.

Qiu, et al., "Quantifying Query Ambiguity", SIGIR'07, Jul. 23-27, 2007, http://www.scils.rutgers.edu/etc/mongrel/cronen-townsend-croft-hlt.pdf.

Hauff, et al., "Improved Query Difficulty Prediction for the Web", CIKM'08, Oct. 26-30, 2008, Napa Valley, California, USA, http://delivery.acm.org/10.1145/1460000/1458142/p439-hauff.pdf?key1=1458142&key2=4740109321&coll=GUIDE&dl=GUIDE&CFID=12.

He, et al., "Query Performance Prediction", May 2005, http://ir.dcs.gla.ac.uk/smooth/ls-special-final.pdf.

Qiu, et al., "Quantify Query Ambiguity using ODP Metadata", SIGIR'07, Jul. 23-27, 2007, Amsterdam, The Netherlands, http://delivery.acm.org/10.1145/1280000/1277864/p697-qiu.pdf?key1=1277864&key2=8090109321&coll=GUIDE&dl=GUIDE&CFID=29864123&CFTOKEN=64461554.

Song, et al., "Identifying Ambiguous Queries in Web Search", WWW 2007, May 8-12, 2007, Banff, Alberta, Canada, http://delivery.acm.org/10.1145/1250000/1242749/p1169-song.pdf?key1=1242749&key2=5001109321&coll=GUIDE&dl=GUIDE&CFID=29864448&CFTOKEN=99990503.

Winaver, et al., "Towards Robust Query Expansion: Model Selection in the Language Modeling Framework", SIGIR'07, Jul. 23-27, 2007, Amsterdam, The Netherlands, http://iew3.technion.ac.il/~kurland/robustExpansion.pdf.

Zhou, et al., "Ranking Robustness: A Novel Framework to Predict Query Performance", CIKM'06, Nov. 5-11, 2006, Arlington, Virginia, USA, http://maroo.cs.umass.edu/pub/web/getpdf.php?id=674.

* cited by examiner

QUERY CLASSIFICATION

BACKGROUND

In a computing environment, searching for particular documents and/or documents that are relevant to a particular category can involve posing a query to a search engine. Often a user may be looking for documents pertaining to a particular topic, or even for a specific document, and will create a query that helps identify the document or documents. Commonly, searches involve a set of documents, such as an Internet user searching for web-pages on a particular topic, or an employee of an enterprise searching for a document from the enterprises data storage system. In these examples, the set of documents searched by the user (web-pages on the Internet and files in a server system) are often indexed to facilitate query-based searching. An index can comprise data that represents the documents in a manner that allows query-based searching. Further, the structure of an index allows the information to be updated, such as by a web-crawler adding pages to the search index.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Documents, such as text-based files, images, videos, and other files comprising data strings (e.g., computer program files), may be considered to belong to categories based on the topics or classes of objects that are covered in the document. Queries to a set of documents using search engines may also be considered to belong to categories based on the elements that make up the query. For example, a query may be comprised of keywords, captions, or some other data string; each of which can be considered to belong to a category individually or in combination. These categories may help characterize information or underlying intent requested by the query (e.g., "query: cardinals in 'sports>football'" versus "query: cardinals in 'society>religion'"), and/or an aspect of the desired results (e.g., format, reading level, authoritativeness, etc.).

Previous techniques base query classification on content of documents returned from the query. However, because classifying entire documents at query search time is computationally expensive (due to efficiency), these prior and current techniques often resort to shortcuts, such as snippet classification. The use of shortcuts in document classification typically discards information that may be relevant to a query search, and may reduce desired outcome of such query searches.

Techniques and/or systems are disclosed herein that mitigate shortcut classifications of documents returned from a query search. Further, a query classification index can be constructed that mitigates a need for performing a search engine retrieval of documents prior to classifying a query into relevant categories, for example, which can alleviate computational costs for a search query. Additionally, a number of useful applications can be layered on top a query classification distributions, which may provide more relevant search results.

In one embodiment, where documents in an index have been classified into one or more category predictions for a category hierarchy (e.g., such as classifying a web-crawl index into classes of topics), providing query results based on categorization of searched content comprises generating classification metadata for categories to which a document in the index has been classified. Further, the classification metadata can then be associated to the corresponding documents in the index, for example, by attaching the metadata to the documents. Additionally, in one embodiment, a query of the index can be classified using the metadata associated to the documents in the index, for example by category. Then query results can be provided that are classified by the one or more categories identified by the classification of the query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
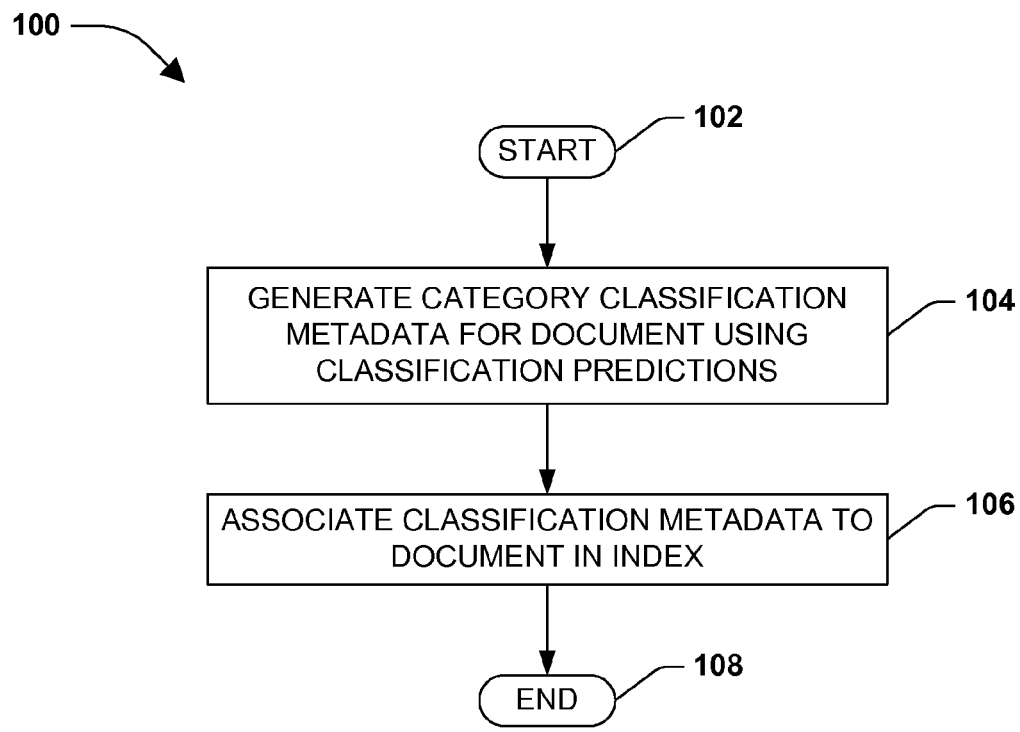
FIG. 1 is a flow chart diagram of an exemplary method for providing query results based on categorization of searched content.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for constructing a query classification index that may mitigate a need to perform a search engine retrieval, which can be computationally expensive; and allows for useful applications to be layered on top of query distributions. FIG. 1 is a flow chart diagram of an exemplary method 100 for providing query results based on categorization of searched content.

The exemplary method 100 begins at 102 and involves generating classification metadata for a category to which a document in an index of documents is classified, where documents in the index have been classified into one or more category predictions for a category hierarchy. For example, web-based search engine commonly utilize a web-crawler to identify web-based documents, and the contents associated with them. The documents are often placed into a search index along with keyword content of the document identified by the web-crawler.

In one embodiment, categories may be classified by topics and the documents can be classified into a topic hierarchy, such as by general categories that contain sub-categories (e.g., sports>football>pro-football>team-name>player-name), based on the content of the document. In this embodiment, metadata that identifies a category can be created for the document, based on the one or more categories into which the document may be classified. Classification of a document can result in more than one identified category for the document, for example, where the document classification results in two or more categories meeting a desired classification threshold (e.g., having a pre-determined number of keywords associated with the category).

At 106 in the exemplary method 100, the classification metadata is associated with the document in the index. In one embodiment, the metadata may be a simple data tag that represents a classification category. In this embodiment, for respective classification categories identified for the document, the corresponding generated metadata tag can be attached to the document in the index, such as a web-search index. In this way, for example, a resulting index may comprise a list of documents, respectively having one or more (or maybe none) metadata tags attached, that can be used to identify one or more categories for the document.

In one aspect, the classification of document in an index into category predictions for a category hierarchy, such as by topics, can be undertaken in different ways. In one embodiment, a trained classifier may be used to identify one or more categories, such as by topic, for a document in the index, based on a desired threshold. For example, a web-page classifier may be trained to classify documents retrieved by a web-crawler into a hierarchy based on keywords or phrases found in the document. Typically, trained classifiers utilize a "confidence-based" classification. For example, where a confidence value can be assigned to a web-page for a particular category, the value can be a representation of how confident the classifier is that the web-page belongs to the category (e.g., 65%).

In this embodiment, a desired confidence level threshold may be set that allows a document to be classified into a particular category by the classifier. For example, where one may desire more precise search results, a ninety-five percent confidence level may be set as a threshold. Therefore, in this example, in order for a particular category to be assigned to a document the classifier needs to be at least ninety-five percent confident that the document belongs to a category (e.g., based on the keywords and/or phrases found in the document that correlate to a category, such as "football" is associated with "sports").

Further, in this aspect, in one embodiment, a retrieval relevance score can be used to classify categories for a document. A score can be determined for a document to identify one or more categories for the document, based on a desired threshold. Typical relevance scores comprise variables such as a document's on-page factors, keywords, content, and if online, the page's link popularity, user engagement and competition for related phrases. As an example, these variables can be assigned a value and run through an algorithm that determines a relevance score for a category for a document. In this embodiment, if the relevance score for a category, such as a topic, meets a desired threshold, the category may be assigned to the document.

It will be appreciated that the methods and systems, described herein, are not limited to the embodiments of indexed documents described above. It is anticipated that those skilled in the art may devise alternate document indices that can utilize the techniques described herein. For example, document classification can be extended to enterprise data searching, desktop (or laptop) searching, searching over a private collection, searching of a federated collection of document, and more. Further, the index may or may not be generated from an online crawl, and the searching may or may not be conducted online.

In another aspect, a source collection of documents that is subject to a classification may be comprised of a variety of collections that are federated to an index. For example, a knowledge-based search, such as a library, may utilize an index that comprises documents from internal archives, online documents, other library collections, private collections, and more. In one embodiment, while the collections of documents may be disparate, and may comprise a variety of potential categories, they can be federated together and classified to one or more categories, as described above. Further, in another embodiment, the separate collections may be indexed and custom categories can be created for the respective collections.

In another aspect, category classification and metadata association for respective documents in an index may be performed at crawl-time of the document source (e.g., the collection of documents crawled to create/update the index), or at a desired time after the index is created. In one embodiment, respective documents may be classified into categories as they are identified by a crawler. In this embodiment, upon classification at crawl-time, the metadata can be generated for the respective classification categories, and the metadata can be associated to the document in the index. In this way, for example, the index for the documents is created at crawl-time, along with the associated metadata that described the categories for the respective documents.

In FIG. 1, having associated metadata with classified documents in an index, the exemplary method 100 ends at 108.

In one aspect, an index of documents may be utilized in a search query for relevant documents. An index of documents may represent an entirety of the documents available for a search, or can represent a sub-set of the documents that one may wish to query. For example, an index that is used by an online search engine merely comprises those web-pages crawled by its web-crawler from all of websites connected to the Internet. However, an index of an enterprise data base may comprise representations of the respective documents stored for the enterprise.

Figure 2:
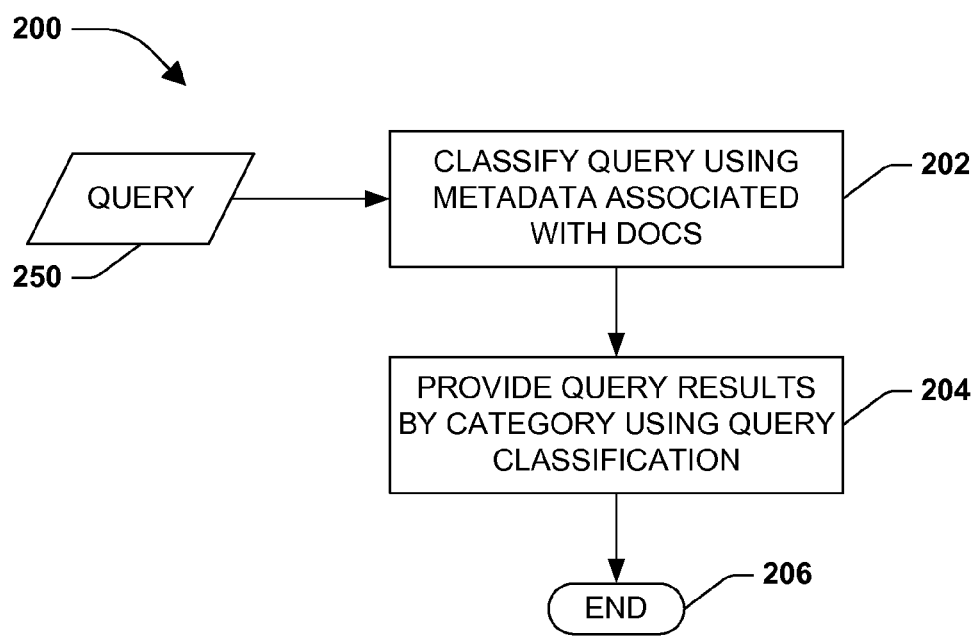
FIG. 2 is an exemplary embodiment of a portion of a method where query results can be provided based on classification of documents in an index.

In this aspect, in one embodiment, one may use the metadata associated with the documents in an index to classify a query and predict appropriate query results. FIG. 2 is an exemplary embodiment of portion of a method 200 where query results can be provided based on the classification of documents in an index. In the exemplary embodiment, a query is issued 250, for example, by a user wishing to identify relevant documents from a set of documents (e.g., a user wishing to finding web-pages showing college football scores on the Internet; or a CFO wishing to find monthly financial reports for particular offices on an enterprise data management and storage system).

In this embodiment 200, a search engine can use the query 250 to search an index, and the query can be classified using the metadata associated to the documents in the index, at 202. For example, a one word query, such as "bass," may be classified into a plurality of topic categories such as fish>bass, stringed-instrument>bass, and men's shoes>bass. Further, the respective topic categories may be sub-topics in one or more larger categories, such as outdoor recreation>sports>fishing>fresh water>fish>bass, arts>music>musical instruments>stringed instruments>bass, and shopping>clothing>footwear>shoes>men's shoes>bass.

In this embodiment, respective keywords or combinations of keywords in a query can be used to identify documents in the index, based on the content keywords and phrases stored by the index for the respective pages. Further, the metadata that represents the categories associated with the documents can be used to classify the respective query keywords and/or combinations, for example, by counting a how many times a category is identified as associated with a document called by query.

Figure 3:
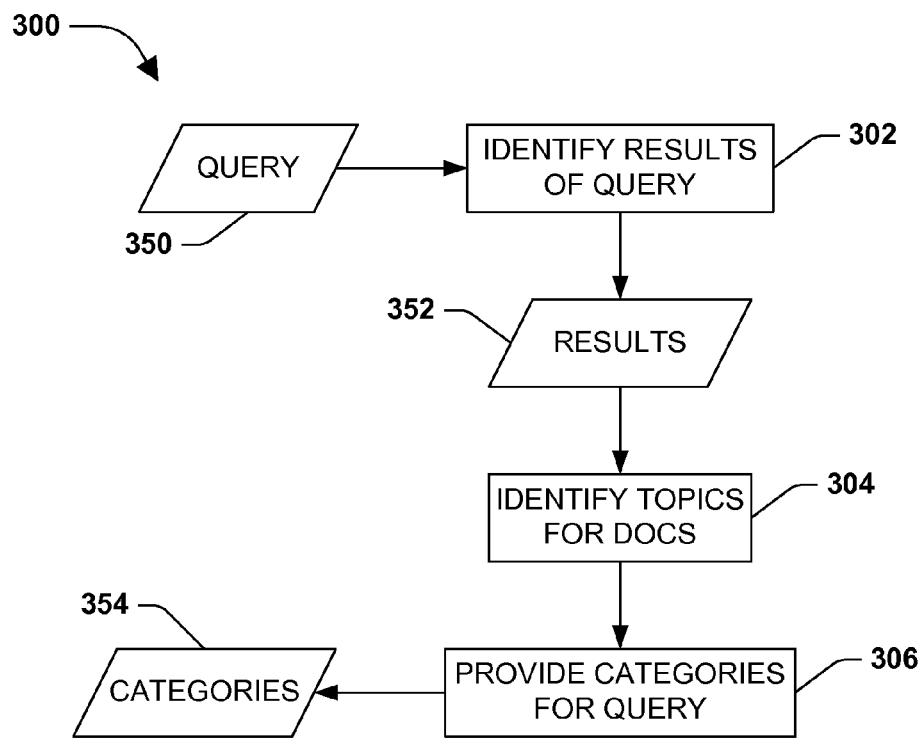
FIG. 3 is one exemplary embodiment of a portion of a method where a query of an index can be classified using metadata associated to documents in the index.

FIG. 3 is one exemplary embodiment 300 of a portion of a method where a query of the index can be classified using the metadata associated to the documents in the index. The when a query 350 is posed, document results 352 for the query can be identified from the index, at 302, such as by using a search engine. At 304, one or more categories for the respective documents results can be identified using a distribution of the categories that is provided by the metadata attached to respective documents.

Figure 4:
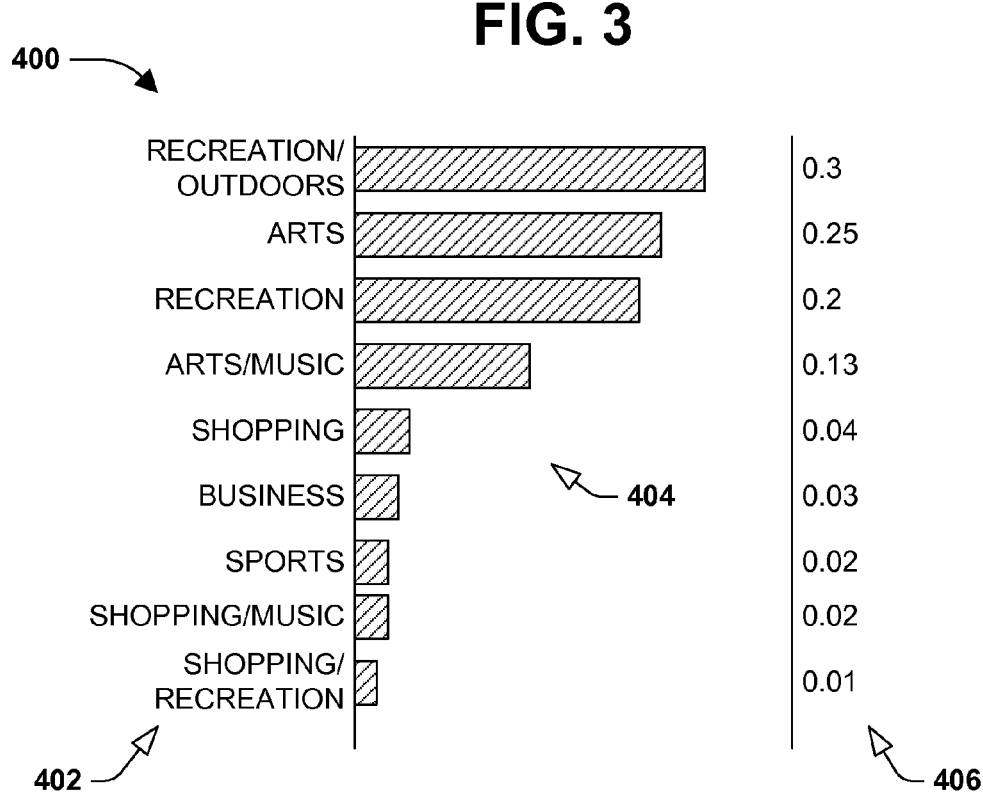
FIG. 4 is a diagram illustrating an exemplary chart of classifications.

FIG. 4 is a diagram illustrating an exemplary chart 400 of category classification. In this exemplary chart 400, a query "bass" may be posed to a web-based search engine. Classification category topics 402 can come from metadata attached to documents in the index, and the topics corresponding to documents identified as having content related to the query are shown in a distribution 404. Therefore, in this example, the query has been classified into the topics 402 identified by using the metadata associated to the documents in the index.

Returning to FIG. 3, at 306, one or more categories 354 for the query can be provided (e.g., predicted) based on a distribution of the one or more identified categories for respective documents in the results. For example, as illustrated in FIG. 4, the topics may be distributed by rank 404 based on how many documents returned by a query are classified into respective topics for the query. In the exemplary chart 400, a percentage 406 of a total number of documents returned by the query for the topics can provide a distribution ranking 404 of the respective topics 402. In this example, "recreation/outdoors" is attached to thirty percent of the documents returned from the index, "arts" is attached to twenty-five percent of the documents returned from the index, and so-on.

In one embodiment, the number of provided query categories 354 may result from a cut-off threshold value, where a desired percentage/ranking for the categories is needed for the document to be included in the returned results. For example, in FIG. 4, a query of "bass" may return the categories 354 from merely the topics 402 recreation/outdoors, arts, and recreation.

Returning to FIG. 2, at 204, query results can be provided that are classified by one or more categories using the classification of the query. In one embodiment, the query results provided (e.g., the documents from the index) may be representative of categories that have a desired number (e.g., top percentage) of documents associated with the category. In another embodiment, a search engine may return results for the respective categories, and may also return merely categories that meet a desired ranking/percentage threshold. In another example, the search engine may return results for the respective categories.

As described above, a set of documents that is represented by an index may comprise one or more types of documents from one or more collections. For example, documents can comprise text files, spreadsheets, presentations, web-pages, photos, images, videos, programs, and many more. Further, documents can be found on the Internet as part of an advertisement, social network, virtual storage, websites, video sites, for example. Therefore, when a query is performed for documents the query can be posed in different ways and may be comprised of a variety of elements.

In one embodiment, a query may be comprised of keyword terms (and/or combinations of terms) for a search-based query, such as for an Internet-based search engine. A query can also be comprised of keywords associated with Internet-based advertisements, such as when an advertisement is placed on a search result page based on a keyword. Further, a query can be comprised of tag terms associated with a file, such as when searching an enterprise database for a word file containing particular terms. Additionally, a query can be comprised of keywords associated with a caption, such as for a photo or video.

It will be appreciated that the techniques and systems described herein are not limited to these embodiments of document types and query elements. Those skilled in the art may devise alternate document types and query elements that can utilize the techniques described above. The embodiments described above are merely examples of how the techniques may be applied.

Figure 5:
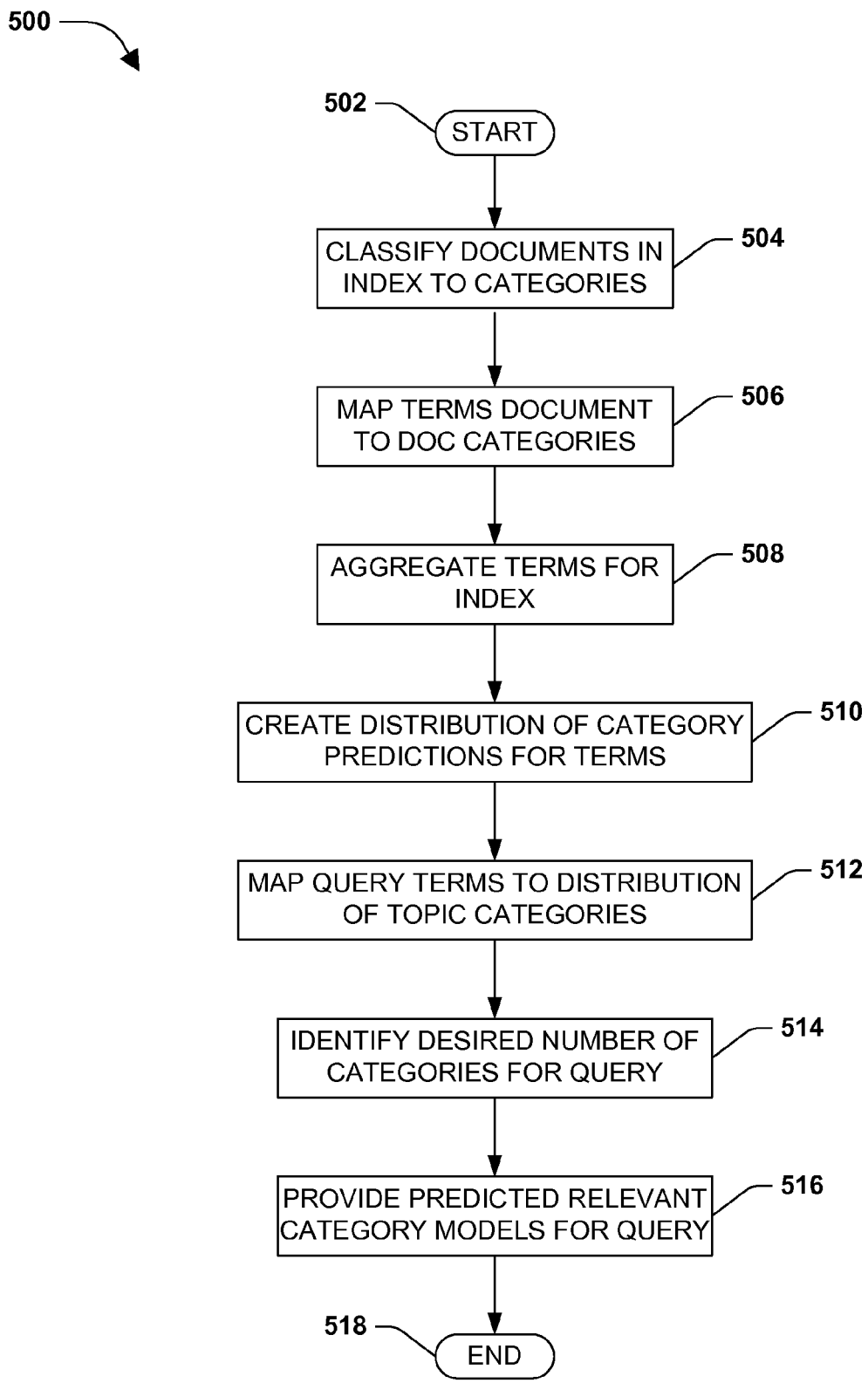
FIG. 5 is a flow diagram illustrating one embodiment of a portion of a method where elements of a query may be classified into categories.

In one aspect, a query classification index can be created that maps words and phrases to category distributions, which may allow for efficient query classification without having to perform a search engine retrieval, for example. FIG. 5 is a flow diagram illustrating one embodiment of a portion of a method 500 where elements of a query may be classified into categories. The exemplary embodiment of the method 500 begins at 502 and involves classifying documents that are in an index into categories. As described above, a set of documents (e.g., web-pages, enterprise documents) can be stored as an index and classified into topics, for example, by a using a trained classifier and/or by determining a retrieval relevance score. For example, a naive-Bayes or a logistic regression classifier can be trained over a crawl of a set of documents and used to label the respective documents in the index with one to three category predictions, depending on a desired threshold.

After classification, a mapping of query terms to a category distribution for the index can be built. At 506, terms (e.g., words, phrases, captions, data-strings, etc.) found in a document (e.g., text document, image, video, other file) can be mapped to the one or more category predictions for the document. In one embodiment, the respective documents in the index can be scanned for terms (e.g., keywords), for example, by using a unigram language model to evaluate respective terms independently of context with other terms in the document. In this embodiment, the terms identified in a document can be mapped to the one or more category predictions associated with the document in the index.

At 508, the terms mapped for the index can be aggregated to create a distribution of category predictions for the respective terms, and a category prediction distribution can be created for the aggregated terms, at 510. For example, a term "bass" may be identified in a plurality of documents in the index. In this embodiment, the respective category predictions for the documents in which "bass" is found can be aggregated to create a topic distribution for "bass", such as shown in the exemplary chart 400, in FIG. 4. In this way, in this example, a topic distribution for the term "bass" can be created without performing a query search for the term.

When building a mapping of terms, a query of the index can be classified using the metadata associated to the documents in the index. At 512, when a query is posed, respective query terms (and/or combinations of terms) can be mapped to the distribution of category predictions for the respective terms in the index. For example, if "bass" is a term in a posed query, it can be mapped to the category predictions distribution created for "bass" (e.g., as in FIG. 4, 400). Further, if a query comprises more than one term, the respective terms can be mapped to corresponding category predictions distributions.

At 514, one or more categories for the query can be identified using the query term mapping. In one embodiment, respective terms in a query (one or more) can each elicit category predictions. For example, a query for "apple" may result in topics such as food, agriculture, computers, electronics, etc. Further, a query for "apple pie" may elicit those for "apple" plus additional topics for "pie," such as home, shopping, cooking, dessert, etc.

At 516, one or more predicted relevant topic models for the query can be provided based on the distribution of the identified categories for the query. In one embodiment, topic models may comprise category predictions from an intersection of the sets of categories for a multi-term query. For example, both "apple" and "pie" category predictions may include "food" and "cooking," where as category predictions for "apple iPod" may both include "computers" & "electronics."

In another embodiment, a desired number (e.g., top 10) of category predictions can be selected for relevant topic models. For example, those categories that meet a threshold of percentage of all topics (e.g., as in FIG. 4, 406) may be selected for the respective terms in the query. In another embodiment, a combination of intersecting topics and those meeting a threshold can be selected. In this way, for example, when a query is posed, relevant topic models can be predicted prior to a search of the index, which can increase efficiency of the search of the index.

In one aspect, query category distributions may be utilized to enhance query output from a search of a set of documents. In one embodiment, query ambiguity may be determined for a query by using an ambiguity function that accounts for a spread of a distribution of categories for the query, for example, to generate an ambiguity score for the query. For example, after a query classified into topic predictions, one may use a spread of the distributions of the predicted topics to evaluate entropy, or a similar measure, between the topics in the distribution.

Figure 6:
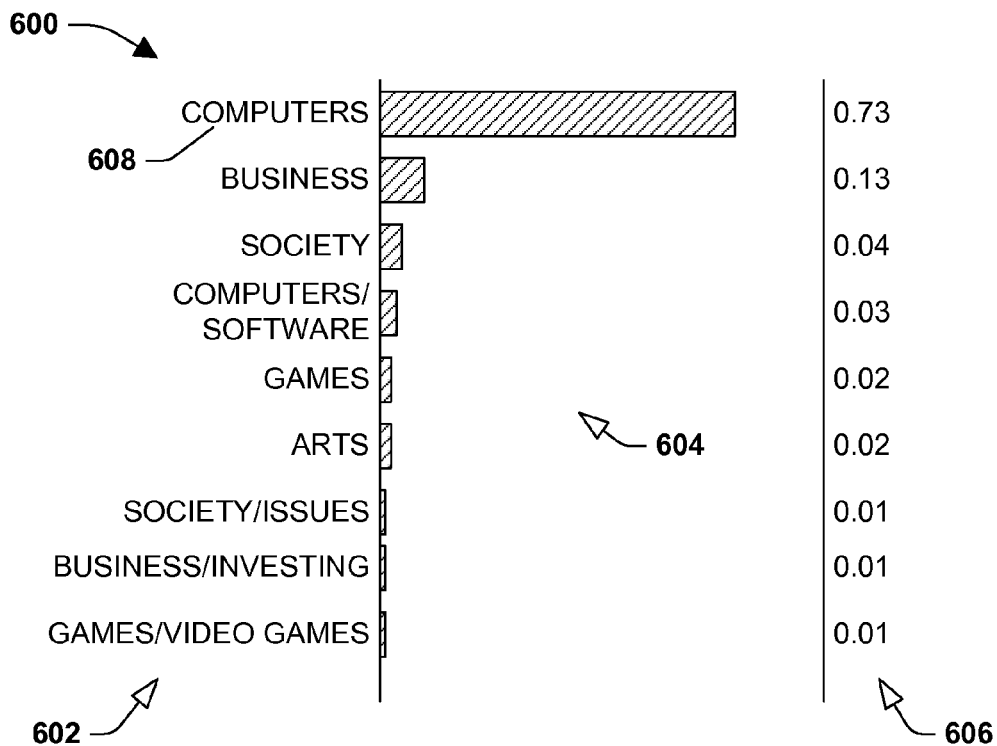
FIG. 6 is a diagram of a chart illustrating an exemplary distribution of query categories.

FIG. 6 is a diagram of a chart illustrating an exemplary distribution 600 of query topics. In this example, the distribution 600 can represent a query for a large computer technology company. Resulting category predictions 602 show expected topics for such a query, along with the graphic ranking 604 of the topics, and the percentage of documents 606 from the set of documents in the index that are associated with the respective categories. The exemplary distribution 600 illustrates that seventy-three percent of the documents are associate with "computers" with the remaining documents being associated with the other topics at much smaller percentages.

In this example, a resulting ambiguity score may be determined by applying an ambiguity function to a desired number of categories in the distribution. For example, the function may account for a top three categories (e.g., computers, business, and society in FIG. 6) to determine if the query is ambiguous. In FIG. 6, the function may predict that the query for the large computer technology company is not ambiguous due to the distribution. However, applying an ambiguity function to the query "bass" as in FIG. 4, 400, may yield a result, such as a score, that is more ambiguous than the distribution in 600.

In another embodiment, in this aspect, a query similarity between the query and an alternate query may be determined by comparing the distribution of the categories associated with the query and the distribution of the categories associated with the alternate query. For example, a first query for "bad credit mortgage" may result in a similar topic distribution as a second query for "refinance." FIG. 7 is a diagram of charts 700 and 750 illustrating exemplary distributions of query topics.

Figure 7:
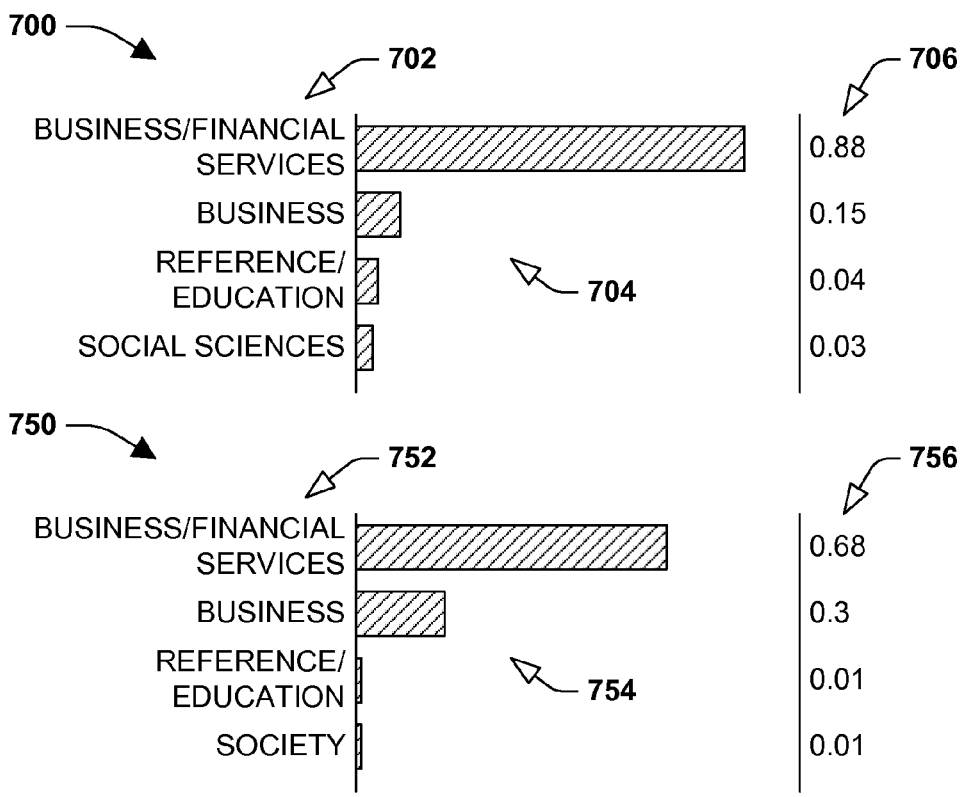
FIG. 7 is a diagram of charts illustrating exemplary distributions of query categories.

In FIG. 7, the distribution for the query "bad credit mortgage" can be shown in the chart 700, and the distribution for the query "refinance" can be shown in the chart 750. In the exemplary distributions of topics 702 and 752, similar topics have been identified for the queries. Further, the rankings 704 and 754, and the percentage of documents for respective topics 706 and 756 have similar distributions for the top categories "business/financial service" and "business."

In this embodiment, a query similarity score for these two queries, for example, can be determined by calculating a similarity function using the distribution of the categories associated with the first query and the distribution of the categories associated with the second query. In this way, in this example, a similarity score for "bad credit mortgage" and "refinance" may show more similarity that one between the queries in FIGS. 4 and 6.

In another embodiment, the determination of query ambiguity for a query can be combined with the determination of query similarity between the query and an alternate query to yield a query quality characteristic. In this embodiment, query quality may be predicted in a variety of ways. For example, where a query is very precise (e.g., low ambiguity score) but does not have a good match with an alternate query (e.g., high query similarity score) one can have a higher confidence that the two queries do not match. In this example, the first query is not ambiguous so it has a low chance of having multiple meanings, and therefore is less likely to have mistaken category predictions for the similarity prediction.

On the other hand, if the first query is ambiguous and is a bad match, the poor similarity prediction may be due to the query's ambiguity. In one embodiment, an ambiguity score and similarity score may be combined resulting in an overall quality score for a query, when comparing it to another query. For example, an online advertiser may want to mitigate a chance that their word-based ads are not erroneously associated with a search engine query that is not topical to their advertisement. In this embodiment, an overall quality score can be generated for the ad as compared with the search engine query.

In another aspect, a query refinement score can be determined for an alternate query (e.g., a refinement of a first query that is composed after the first query does not return desired results) that can be used to measure whether the alternate query is a more specific refinement of one or more portions of the query, a more general refinement of one or more portions of the query, or an orthogonal concept to one or more portions of the query (e.g., neither more general nor more specific). For example, where a first query may be for "football," an alternate query for "professional football" would be a more specific refinement, an alternate query for "sports" would be a more general refinement, and an alternate query for "telephones" would be orthogonal. In this way, a query refinement score may facilitate query classification by utilizing existing topic distributions for the query, or having to begin a new query classification.

Figure 8:
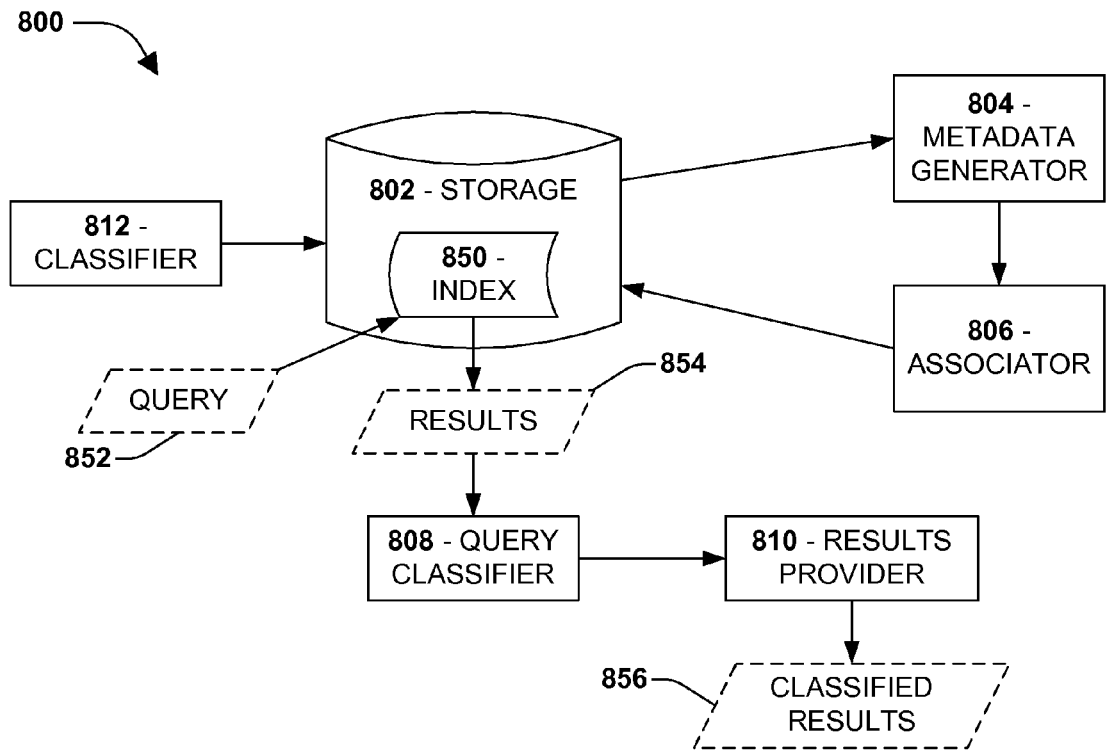
FIG. 8 is a component block diagram of an exemplary system for providing query results based on categorization of searched content.

A system may be devised that helps characterize intent of a query of a set of documents by constructing a query classification index for example, and mapping query terms to the constructed index for classification into categories. FIG. 8 is a component block diagram of an exemplary system 800 for providing query results based on categorization of searched content, such as an index of documents. For example, a set of documents (e.g., web-pages, enterprise files, image and video libraries) may be crawled and indexed for later retrieval using a search engine.

The exemplary system 800 comprises computer-based storage 802 that is configured to store classification metadata associated with documents in an index of documents 850. Further, where documents in the index 850 have been classified into one or more category predictions for a category hierarchy, a metadata generator 804 is configured to generate classification metadata for a document in the index, which identifies a category to which the document in the index 850 has been classified. For example, a trained classifier 812 may be used to classify documents, from a set of documents, into one or more categories, and the metadata generator 804 can generate metadata that identifies the one or categories.

Additionally, a metadata association component 806, which is operably coupled to the storage 802, is configured to associate the classification metadata to the corresponding document in the index 850. Therefore, for example, the index 850 may comprise documents that have attached metadata identifying their respective classification topics.

In one embodiment, the exemplary system 800 comprises a query classifier 808 that is configured to classify a query 852 of the index 850 using the metadata associated to the documents in the index, in association with results of the query 854. For example, where a query may return resulting documents based on the search engine used, the metadata attached to the returned documents can be used by the query classifier 808 to classify the query into categories. Further, in this embodiment, the query classifier 808 can comprise a query distribution component that is configured to generate a distribution of categories (e.g., a ranking of topics based on an aggregation of metadata for the returned documents), provided by the metadata, for query results.

Additionally, in this embodiment, a classified query results provider 810, which is operably coupled to the query classifier 808, can provide query results classified by one or more categories 856 using the classification of the query from the query classifier 808. For example, the query results provider 810 may be set to provide query results for a desired number or categories that meet a threshold for number of documents in a category (e.g., top three categories by percentage of documents in the category, such as in chart 400 of FIG. 4). In this way, in this example, merely those categories that comprise a desired number of matching documents will have results returned in the classified results 856.

Figure 9:
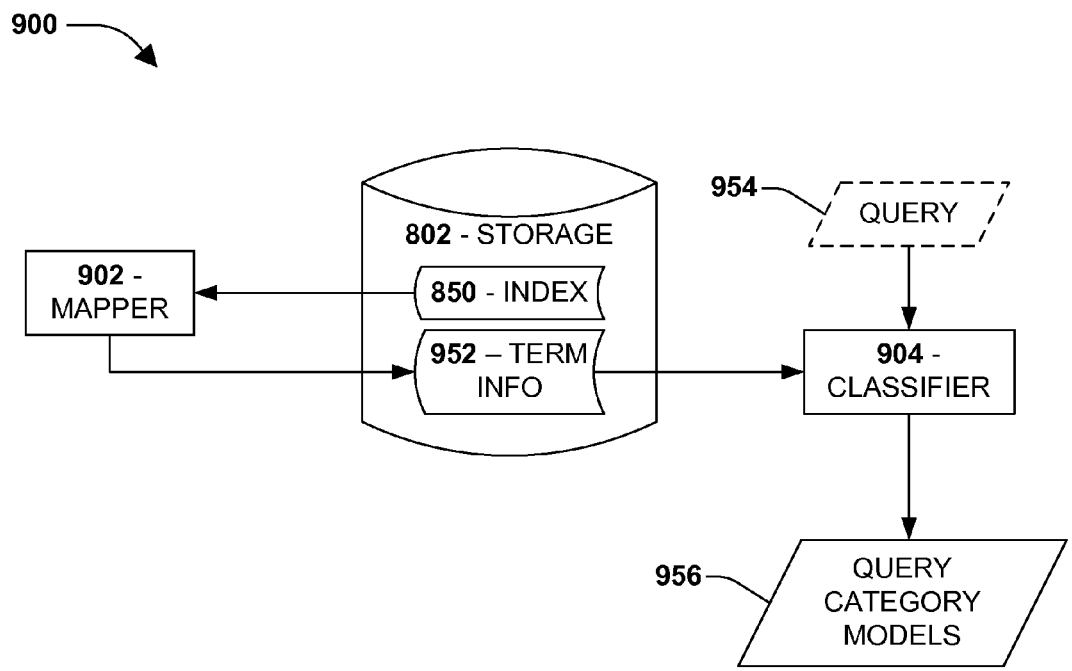
FIG. 9 is a component block diagram of an exemplary portion of a system, where elements of a query may be classified into categories.

FIG. 9 is a component block diagram of an exemplary portion of a system 900, where elements of a query may be classified into categories. In the exemplary portion of a system 900, a document term mapper 902 is configured to map respective terms in a document in the index 850 to the one or more category predictions for the document. Further, the document term mapper 902 is configured to aggregate the terms mapped for the index 850 to create a distribution of category predictions for the respective terms 952. In one embodiment, the category predictions for the respective terms 952 can be stored in the data storage component 802 for the system.

Additionally, in the exemplary portion of the system 900, a mapped query classifier 904 configured to map respective query terms (e.g., words, data strings, captions, etc.), for a query 954 of the index 850, to the distribution of category predictions, such as those in storage 802 from the document term mapper 902, for the respective terms in the index 850. The mapped query classifier 904 is also configured to identify one or more categories for the query 954 using the query term mapping, and provide one or more predicted relevant topic models 956 for the query based on the distribution of the identified categories for the query.

Figure 10:
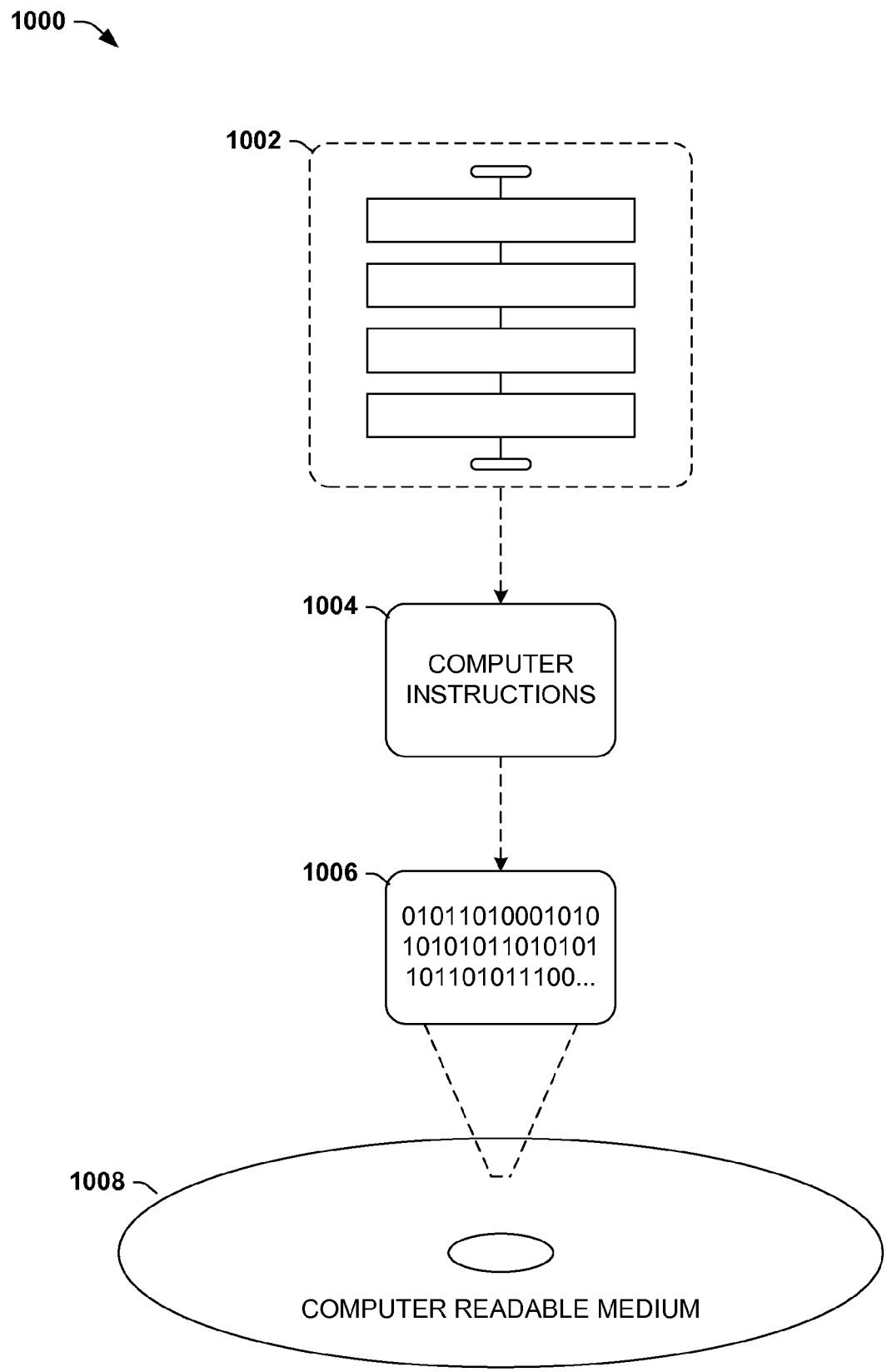
FIG. 10 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1008 (e.g., a CD-R, DVD-R, or a platter of a hard disk drive), on which is encoded computer-readable data 1006. This computer-readable data 1006 in turn comprises a set of computer instructions 1004 configured to operate according to one or more of the principles set forth herein. In one such embodiment 1002, the processor-executable instructions 1004 may be configured to perform a method, such as the exemplary method 100 of FIG. 1, for example. In another such embodiment, the processor-executable instructions 1004 may be configured to implement a system, such as the exemplary system 800 of FIG. 8, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
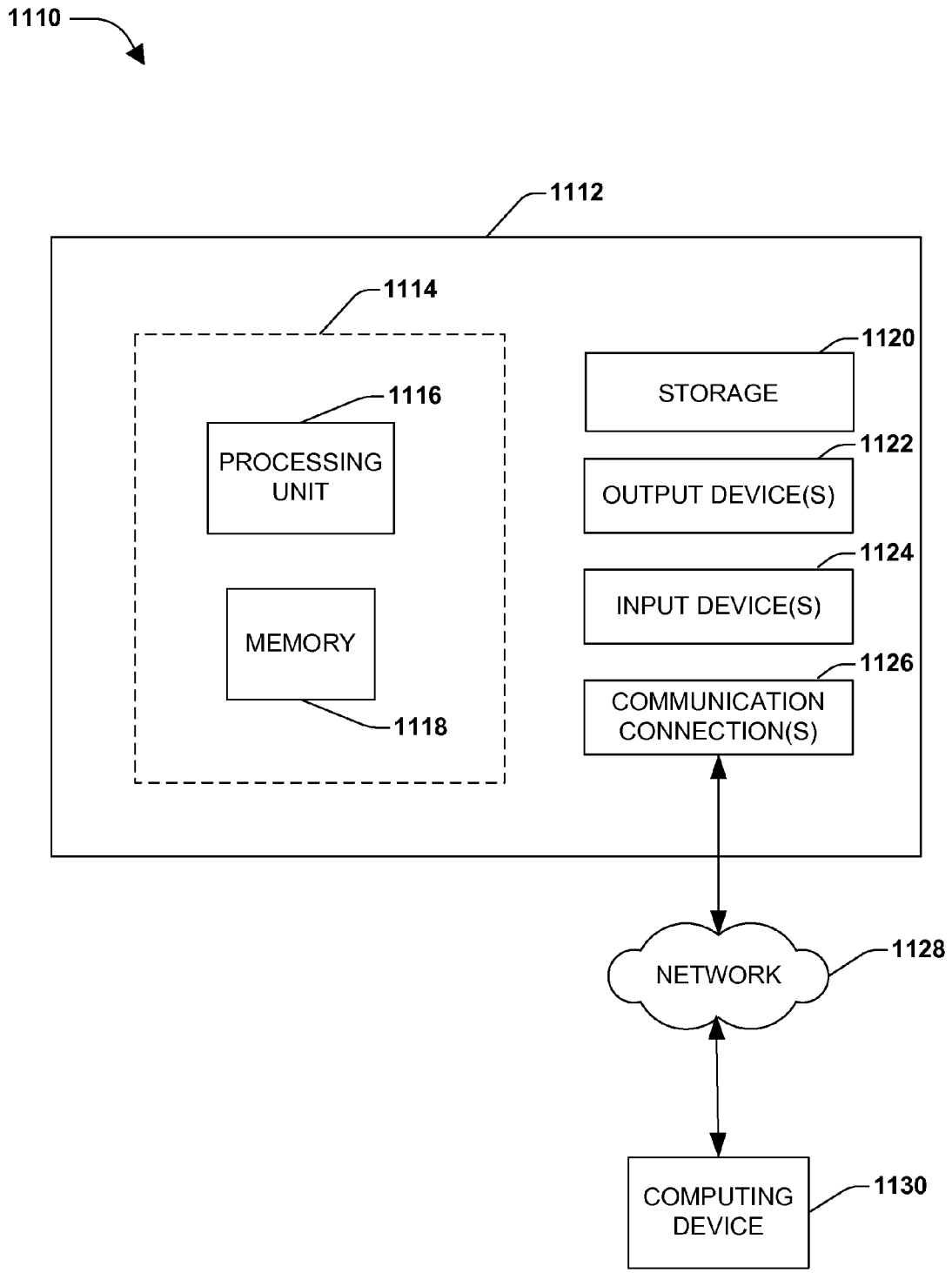
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, implemented at least in part via a processing unit comprising hardware, for classifying a query, comprising:
    performing a search of an index of documents using a query to obtain initial search results comprising one or more documents referenced in the index of documents, a document referenced in the index of documents assigned a category at crawl time;
    classifying the query with a classification distribution based upon one or more categories assigned to the one or more documents within the initial search results, the classification distribution comprising at least a first percentage of documents within the initial search results associated with a first category and a second percentage of documents within the initial search results associated with a second category, the first percentage corresponding to a first confidence level and the second percentage corresponding to a second confidence level;
    determining an ambiguity score for the query based upon a spread of at least the first percentage and the second percentage within the classification distribution; and
    returning query results based upon the ambiguity score.

2. The method of claim 1, the classifying the query comprising:
    assigning retrieval relevance scores to respective categories within the classification distribution.

3. The method of claim 1, comprising:
    updating the index of documents.

4. The method of claim 1, comprising:
    determining a query similarity score between the query and an alternative query based upon comparing the classification distribution to an alternative classification distribution for the alternative query.

5. The method of claim 1, comprising:
    determining a query quality characteristic based upon combining the ambiguity score for the query and a query similarity score between the query and an alternative query.

6. The method of claim 1, comprising:
    determining a query refinement score for an alternative query of the query based upon determining at least one of:
        the alternative query is a specific refinement of at least a portion of the query;
        the alternative query is a general refinement of at least a portion of the query; or
        the alternative query is an orthogonal concept to at least a portion of the query.

7. The method of claim 2, the returning query results comprising:
    identifying a set of categories within the classification distribution that comprise retrieval relevance scores above a score threshold; and
    identifying one or more documents as query results based upon the one or more documents being associated with one or more categories within the set of categories.

8. A system for classifying a query, comprising:
    one or more processing units; and
    memory comprising instructions that when executed using at least one of the one or more processing units, implement a query component configured to:
        perform a search of an index of documents using a query to obtain initial search results comprising one or more documents referenced in the index of documents, a document referenced in the index of documents assigned a category at crawl time;
        classify the query with a classification distribution based upon one or more categories assigned to the one or more documents within the initial search results, the classification distribution comprising at least a first percentage of documents within the initial search results associated with a first category and a second percentage of documents within the initial search results associated with a second category; and
        determine a query similarity score between the query and an alternative query based upon comparing the classification distribution to an alternative classification distribution for the alternative query.

9. The system of claim 8, the query component configured to:
    assign retrieval relevance scores to respective categories within the classification distribution.

10. The system of claim 8, the query component configured to:
    update the index of documents.

11. The system of claim 8, the query component configured to:
   determine an ambiguity score for the query based upon a spread of at least the first percentage and the second percentage within the classification distribution.

12. The system of claim 8, the query component configured to:
   determine a query refinement score for the alternative query based upon determining at least one of:
      the alternative query is a specific refinement of at least a portion of the query;
      the alternative query is a general refinement of at least a portion of the query; or
      the alternative query is an orthogonal concept to at least a portion of the query.

13. The system of claim 9, the query component configured to:
   identify a set of categories within the classification distribution that comprise retrieval relevance scores above a score threshold; and
   identify one or more documents as query results based upon the one or more documents being associated with one or more categories within the set of categories.

14. The system of claim 11, the query component configured to:
   determine a query quality characteristic based upon combining the ambiguity score for the query and the query similarity score between the query and the alternative query.

15. A computer-readable storage medium, excluding signals, comprising instructions that when executed perform a method for classifying a query, comprising:
   classifying a query with a classification distribution based upon one or more categories assigned to one or more documents returned for the query, the classification distribution comprising at least a first percentage of documents associated with a first category and a second percentage of documents associated with a second category;
   determining an ambiguity score for the query based upon the classification distribution; and
   determining a query quality characteristic based upon combining the ambiguity score for the query and a query similarity score between the query and an alternative query.

16. The computer-readable storage medium of claim 15, the classifying the query comprising:
   assigning retrieval relevance scores to respective categories within the classification distribution.

17. The computer-readable storage medium of claim 15, comprising:
   returning query results based upon the ambiguity score.

18. The computer-readable storage medium of claim 15, comprising:
   determining a query similarity score between the query and the alternative query based upon comparing the classification distribution to an alternative classification distribution for the alternative query.

19. The computer-readable storage medium of claim 15, the ambiguity score determined based upon a spread of at least the first percentage and the second percentage within the classification distribution.

20. The computer-readable storage medium of claim 16, comprising returning query results comprising:
   identifying a set of categories within the classification distribution that comprise retrieval relevance scores above a score threshold; and
   identifying one or more documents as query results based upon the one or more documents being associated with one or more categories within the set of categories.

* * * * *